(12) United States Patent
Deck

(10) Patent No.: US 7,042,578 B2
(45) Date of Patent: May 9, 2006

(54) METHOD AND APPARATUS FOR ABSOLUTE FIGURE METROLOGY

(75) Inventor: Leslie L. Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 11/017,210

(22) Filed: Dec. 20, 2004

(65) Prior Publication Data

US 2005/0134864 A1  Jun. 23, 2005

Related U.S. Application Data

(60) Provisional application No. 60/530,506, filed on Dec. 18, 2003.

(51) Int. Cl.
*G01B 9/02* (2006.01)
(52) U.S. Cl. .................................................. 356/514
(58) Field of Classification Search ................ 356/511, 356/512, 513, 514
See application file for complete search history.

(56) References Cited

U.S. PATENT DOCUMENTS

| | | | |
|---|---|---|---|
| 4,594,003 A | 6/1986 | Sommargren | |
| 5,488,477 A | 1/1996 | de Groot et al. | |
| 5,502,566 A | 3/1996 | Ai et al. | |
| 6,006,128 A | 12/1999 | Izatt et al. | |
| 6,028,670 A | 2/2000 | Deck | |
| 6,359,692 B1 | 3/2002 | de Groot | |
| 6,882,432 B1* | 4/2005 | Deck | 356/512 |
| 6,924,898 B1* | 8/2005 | Deck | 356/512 |
| 2003/0164951 A1 | 9/2003 | Deck | |

FOREIGN PATENT DOCUMENTS

WO  WO 02/12825  2/2002

OTHER PUBLICATIONS

L. Deck; "Measurements using Fourier-Transform Phase Shifting Interferometry", Proc. ASPE 25, 115-118 (2001).
L. Deck; "Multiple Surface Phase Shifting Interferometry", Proc. SPIE, 4451, 424-430 (2001).
L. Deck and J.A. Soobitsky, "Phase-shifting via wavelength tuning in very large aperture interferometers," Proc. SPIE, 3782-58, 432-442, 1999.
L. Deck; "Simultaneous Multiple Surface Measurements using Fourier-Transform Phase Shifting Interferometry, in: 4th International workshop on automatic processing of fringe patterns", Fringe 2001, Elsevier, Paris, (2001), 230-236.

(Continued)

*Primary Examiner*—Gregory J. Toatley, Jr.
*Assistant Examiner*—Michael A. Lyons
(74) *Attorney, Agent, or Firm*—Fish & Richardson P.C.

(57) ABSTRACT

An apparatus including: an interferometer comprising a series of three partially reflective reference surfaces, wherein the interferometer is configured to direct electromagnetic radiation to a test surface along a path through the series of three partially reflective reference surfaces, and direct the electromagnetic radiation reflected from each of the surfaces to form an optical interference pattern on a detector, wherein the interferometer comprises a first reference optic supporting the first reference surface and a second reference optic supporting the second and third reference surfaces, and wherein the second reference optic is configured to adjustably rotate to exchange an order of the second and third reference surfaces along the path relative to the first reference surface.

30 Claims, 2 Drawing Sheets

OTHER PUBLICATIONS

P. de Groot, "Chromatic dispersion effects in coherent absolute ranging," Opt. Lett., vol. 17, pp. 898-900, 1992.

Peter de Groot, "Derivation of algorithms for phase-shifting interferometry using the concept of a data-sampling window," Applied Optics, vol. 34, p. 4723, 1995.

Peter de Groot, "Measurement of transparent plates with wavelength-tuned phase-shifting interferometry," Applied Optics, vol. 39, No. 16, pp. 2658-2663, 2000.

Klaus Freischlad, "Fourier Analysis of Phase Shifting Algorithms," Proc. SPIE vol. 3407, pp. 73-85, 1998.

K. Freischlad, "Large flat panel profiler," Proc. SPIE 2862, pp. 163-171, 1996.

J.E.Greivenkamp and J.H.Bruning, "Phase shifting interferometry," Optical Shop Testing, D. Malacara, pp. 501-598, J. Wiley, New York, 1992.

Susumu Kuwamaura and Ichirou Yamaguchi, "Wavelength scanning profilometry for real-time surface shape measurement," Appl. Opt., 36, 4473-4482 (1997).

Okada et al., "Separate measurements of surface shapes and refractive index inhomogeniety of an optical element using tunable-source phase shifting interferometry," Applied Optics, vol. 29, No. 22, pp. 3280-3285, 1990.

M. Suematsu and M. Takeda, "Wavelength-shift interferometry for distance measurements using Fourier transform technique for fringe analysis," Applied Optics, vol. 30, No. 28, pp. 4046-4055, 1991.

Kinoshita M. et al., "Optical Frequency-Domain Imaging Microprofilometry with a Frequency-Tunable Liquid-Crystal Fabry-Perot Etalon Device", *Applied Optics, Optical Society of America*, vol. 38, No. 34, Dec. 1, 1999, pp. 7063-7068.

L. Deck, "Absolute Distance Measurements Using FTPSI With a Widely Tunable IR Laser," Proc. SPIE, 4778, 218-226 (2002).

Doorer, Christophe et al., "Precision and consistency criteria in spectral phase interferometry for direct electric-field reconstruction." *Journal of the Optical Society of America*, vol. 19, Issue 5, pp. 1030-1038 (May, 2002).

Kim, Daesuk et al., "Direct spectral phase function calculation for dispersive interferometric thickness profilometry." *Optics Express*, vol. 12, No. 21, pp. 5117-5124 (Oct., 2004).

Daniel Malacara, "Absolute Testing of Flats", *Optical Shop Testing*, Second Edition, pp. 43-45, Published by John Wiley & Sons, Inc. (1992).

\* cited by examiner

METHOD AND APPARATUS FOR ABSOLUTE FIGURE METROLOGY

CROSS-REFERENCE TO RELATED APPLICATIONS

This application claims priority to U.S. Provisional Patent Application Ser. No. 60/530,506 entitled "Method and Apparatus for Absolute Figure Metrology" by Leslie L. Deck and filed Dec. 18, 2003, the contents of which are incorporated herein by reference.

BACKGROUND

Interferometric optical techniques are widely used to measure surface profiles of precision optical components.

For example, to measure the surface profile of a test surface, one can use an interferometer to combine a test wavefront reflected from the test surface with a reference wavefront reflected from a reference surface to form an optical interference pattern. Spatial variations in the intensity profile of the optical interference pattern correspond to phase differences between the combined test and reference wavefronts caused by variations in the profile of the test surface relative to the reference surface. Phase-shifting interferometry (PSI) can be used to accurately determine the phase differences and the corresponding profile of the test surface. However, the surface profile measurement of the test surface is only relative to the surface profile of the reference surface, which is assumed to be perfect (e.g., flat) within the tolerances of the measurement.

With PSI, the optical interference pattern is recorded for each of multiple phase-shifts between the reference and test wavefronts to produce a series of optical interference patterns that span, for example, at least a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase-offset equal to the phase difference between the combined test and reference wavefronts for that spatial location. Using numerical techniques known in the art, the phase-offset for each spatial location is extracted from the sinusoidal dependence of the intensity values to provide a profile of the test surface relative the reference surface. Such numerical techniques are generally referred to as phase-shifting algorithms.

The phase-shifts in PSI can be produced by changing the optical path length from the measurement surface to the interferometer relative to the optical path length from the reference surface to the interferometer. For example, the reference surface can be moved relative to the measurement surface. Alternatively, the phase-shifts can be introduced for a constant, non-zero optical path difference by changing the wavelength of the measurement and reference wavefronts. The latter application is known as wavelength tuning PSI and is described, e.g., in U.S. Pat. No. 4,594,003 to G. E. Sommargren.

For many applications (e.g., certification of optical components, calibrating a transfer standard, etc.), one desires an absolute measurement of the surface profile of test surface, i.e., a surface profile measurement that is independent of the reference surface used in the interferometric measurement. This is called absolute figure metrology.

Absolute figure metrology for the certification of a flat surface has been a long-standing problem in optical metrology. A summary of proposed solutions can be found in, for example, D. Malacara, *Optical Shop Testing*, $2^{nd}$ Ed., Chap 14, John Wiley & Sons, New York (1992). For flats, prior-art methods rely, at least in part, on the relative measurements of 3 unknown surfaces with respect to each other—the so-called 3-flat test—from which one can solve for the absolute shape of these surfaces along a single meridian. Information about the absolute form of the remainder of the surfaces is obtained with additional rotations to determine other meridians and by invoking symmetry requirements or by a combination of additional rotations, symmetry and/or polynomial fitting to fill in the missing gaps. Similar arguments hold for spheres.

Such techniques typically require enormous effort. Many manipulations of the parts under test are required, requiring both precise yet flexible motion control. Furthermore, the manual nature of the measurement does not lend itself easily to error estimation and makes human error a major contributor to the ultimate uncertainty in the results. Finally, the difficulty involved in producing certification to nanometer levels makes these measurements only possible with highly skilled personnel, making the cost of these measurements prohibitive.

SUMMARY

In general, in one aspect, the invention features an apparatus including an interferometer including a series of three partially reflective reference surfaces, wherein the interferometer is configured to direct electromagnetic radiation to a test surface along a path through the series of three partially reflective reference surfaces, and direct the electromagnetic radiation reflected from each of the surfaces to form an optical interference pattern on a detector. The interferometer includes a first reference optic supporting the first reference surface and a second reference optic supporting the second and third reference surfaces. The second reference optic is configured to adjustably rotate to exchange an order of the second and third reference surfaces along the path relative to the first reference surface.

Embodiments of the apparatus may include any of the following features.

The second reference optic may be further configured to adjustably rotate about the path of the electromagnetic radiation. Alternatively, or in addition, the second reference optic may be further configured to be selectively removed from the path of the electromagnetic radiation so that the electromagnetic radiation reflects only from the first reference surface and the test surface. The apparatus may further include a mount for supporting a test part having the test surface.

The references surfaces may be substantially flat. Alternatively, the reference surfaces may each include a spherical portion. For example, the spherical portions may include a common center of curvature.

The interferometer may include one or more imaging optics to image the reflected electromagnetic radiation to the detector.

The apparatus may further include a source for providing the electromagnetic radiation. The source may include a modulation component configured to vary a property of the electromagnetic radiation provided by the source, wherein the variation causes pairs of the surfaces that have different optical path separations to contribute differently to the interference signal. For example, the modulation component may be configured to vary a frequency of the electromagnetic radiation. The apparatus may further include the detector, wherein the detector is configured to record an interference signal at different locations of the optical interference pattern in response to the variation of the property of the electromagnetic radiation.

The apparatus may further include an electronic processor coupled to the source and the detector. The electronic processor may be configured to process the interference signals recorded by the detector at the different locations for at least a first orientation of the second reference optic in which the second reference surface precedes the third reference surface relative to the first reference surface and a second orientation in which the second reference surface follows the third reference surface relative to the first reference surface.

The electronic processor may be further configured to process the interference signals recorded by the detector at the different locations for additional orientations of the second reference optic in which the second reference optic is rotated about the path of the electromagnetic radiation to determine the absolute surface figure information about the test surface. Alternatively, or in addition, he electronic processor may be further configured to process the interference signals recorded by the detector at the different locations when the second reference optic is removed from the path of the electromagnetic radiation to determine the absolute surface figure information about the test surface.

The processor may be configured to process the interference signals for the different orientations of the second reference optic to determine absolute surface figure information about the test surface. The electronic processor may store information about at least one of a surface profile and a homogeneity profile for the second reference optic and uses that information to estimate the accuracy of the absolute surface figure information about the test surface.

For each orientation of the second reference optic, the electronic processor may be configured to transform the interference signal for at least one of the locations to produce a spectrum having a peak at a spectral coordinate corresponding to each pair of the surfaces, and identify the spectral coordinate of the peak corresponding to one or more selected pairs of the surfaces. For example, the electronic processor may transform the interference signal from a time domain into a frequency domain. For each orientation, the electronic processor may be further configured to extract a spectral phase of the interference signal, for each location, at the spectral coordinate of the peak corresponding to each selected pair of surfaces, and determine an optical path distance, for each location, between each selected pair of surfaces based on the extracted phases.

In general, in another aspect, the invention features an apparatus including: (i) a source for providing a electromagnetic radiation and configured to vary a frequency of the electromagnetic radiation; (ii) an interferometer including a series of three partially reflective reference surfaces, wherein the interferometer is configured to direct the electromagnetic radiation to a test surface along a path through the series of three partially reflective reference surfaces, and direct the electromagnetic radiation reflected from each of the surfaces to form an optical interference pattern on a detector; (iii) the detector, wherein the detector is configured to record an interference signal at different locations of the optical interference pattern in response to the variation of the frequency of the electromagnetic radiation; and (iv) an electronic processor coupled to the source and the detector.

The interferometer includes a first reference optic supporting the first reference surface and a second reference optic supporting the second and third reference surfaces. The second reference optic is configured to adjustably rotate to exchange an order of the second and third reference surfaces along the path relative to the first reference surface and is further configured to be selectively removed from the path of the electromagnetic radiation so that the electromagnetic radiation reflects only from the first reference surface and the test surface.

The electronic processor is configured to process the interference signals recorded by the detector at the different locations for at least a first orientation of the second reference optic in which the second reference surface precedes the third reference surface relative to the first reference surface, a second orientation in which the second reference surface follows the third reference surface relative to the first reference surface, and a third orientation in which the second reference optic is removed from the path of the electromagnetic radiation so that the electromagnetic radiation reflects only from the first reference surface and the test surface, to determine absolute surface figure information about the test surface.

In general, in another aspect, the method includes: (i) directing electromagnetic radiation to a test surface along a path through a series of three partially reflective reference surfaces, and directing the electromagnetic radiation reflected from each of the surfaces to form an optical interference pattern; and (ii) rotating a reference optic supporting the second and third reference surfaces and positioned between the first reference surface and the test surface to exchange an order of the second and third reference surfaces along the path.

Embodiments of the method may include any of the following features.

The method may further include processing information about the optical interference pattern for at least a first orientation of a reference optic in which the second reference surface precedes the third reference surface along the path relative to the first reference surface and a second orientation in which the second reference surface follows the third reference surface along the path relative to the first reference surface to determine absolute surface figure information about the test surface.

The method may further include processing information about the optical interference pattern for additional orientations of the reference optic in which the reference optic is rotated about the path of the electromagnetic radiation to determine the absolute surface figure information about the test surface. Alternatively, or in addition, the method may further include processing information about the optical interference pattern for additional orientations of the reference optic in which the reference optic is removed from the path of the electromagnetic radiation to determine the absolute surface figure information about the test surface.

The method may further include storing information about at least one of a surface profile and a homogeneity profile for the reference optic and using the information about the reference optic to estimate the accuracy of the absolute surface figure information about the test surface.

The references surfaces may be substantially flat. Alternatively, the reference surfaces may each include a spherical portion.

The method may further include varying a property of the electromagnetic radiation, and recording an interference signal at different locations of the optical interference pattern in response to the variation of the property of the electromagnetic radiation, wherein the variation causes pairs of the surfaces that have different optical path separations to contribute differently to the interference signal. For example, the varied property may be a frequency of the electromagnetic radiation.

The method may further include, for each orientation of the rotated reference optic, transforming the interference signal for at least one of the locations to produce a spectrum having a peak at a spectral coordinate corresponding to each pair of the surfaces, and identifying the spectral coordinate of the peak corresponding to one or more selected pairs of the surfaces. The method may further include, for each orientation of the rotated reference optic, extracting a spectral phase of the interference signal, for each location, at the spectral coordinate of the peak corresponding to each selected pair of surfaces, and determining an optical path distance, for each location, between each selected pair of surfaces based on the extracted phases.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control. In addition, the systems, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION OF PREFERRED EMBODIMENTS

Disclosed herein is a method and apparatus for performing absolute figure metrology on a surface of a test component.

In preferred embodiments, the test surface is positioned as the last surface in 4-surface cavity. The remaining surfaces are reference surfaces, two of which are the front and back surfaces of a reference optic, referred to herein as the enabler optic (EO). The EO is mounted within the apparatus to adjustably rotate about one or more axis, one of which exchanges the order of its front and back surfaces relative to the test surface. The EO provides multiple measurement configurations for the relative positions of the different surfaces to provide information sufficient for absolute figure metrology of the test surface. Preferred embodiments exploit the capabilities of Frequency Transform Phase Shifting Interferometry (FTPSI) to simultaneously measure the optical thickness profiles between different pairs of surfaces in the 4-surface geometry. Each pair of surfaces defines an "elemental cavity" that corresponds to a unique frequency in the frequency transform of the PSI interferometry data. The relative surface profile for each elemental cavity corresponds to the phase of the frequency transformed PSI data at the unique frequency for that cavity. FTPSI is described in commonly owned U.S. Patent Application Publication No. US-2003-0160968-A1 entitled "PHASE SHIFTING INTERFEROMETRY METHOD AND SYSTEM" by Leslie Deck, the contents of which are incorporated herein by reference.

To obtain the absolute surface figure of the test surface, the optical thickness variations for different pairs of surfaces in the 4-surface geometry are measured for different orientations of the EO, the test surface itself remains fixed. By limiting manipulations to the EO, the method accommodates a large variety of test optics, narrows the motion control requirements to the EO, which is specifically fixtured for that purpose, and permits automation. Furthermore, because the EO is also fully characterized in the measurement process and stays with the instrument, it can serve to evaluate the efficacy of any particular measurement by comparing the current EO measurement with one or more prior measurements.

FTPSI Measurements in a Four-Surface Cavity

Figure 1:
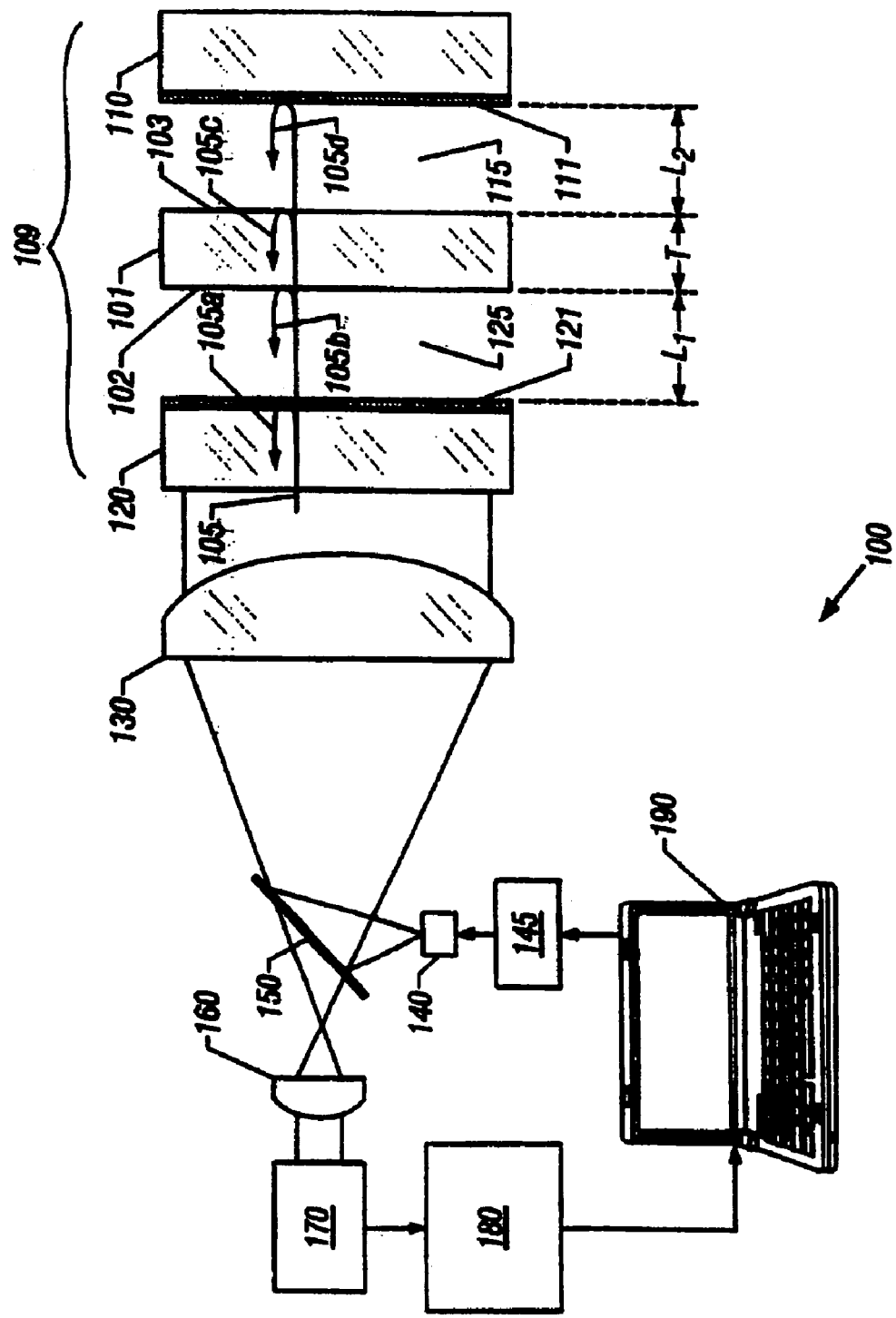
FIG. 1 is a schematic diagram of an interferometer apparatus having a cavity with multiple surface pairs.

An FTPSI apparatus for simultaneously measuring the optical thickness profiles of different pairs of surfaces in a four-surface cavity is shown in FIG. 1.

In a two-surface cavity, a change in optical frequency induces a corresponding change in interference phase that is proportional to the optical path length (OPL). Similarly, in a cavity having more than two surfaces, the multiple reflective surfaces will give rise to interference patterns that have different phase shifts for the same change in optical frequency. Each of the different phase shifts corresponds to the optical path difference between each surface pair (i.e., elemental two-surface cavity) within the cavity. As a result, wavelength-tuned interferometric data from such cavities may be transformed into the frequency domain (e.g., by a using a Fourier transform) to produce a set of spectrally separated frequency peaks. Each such peak corresponds to a particular pair of surfaces in the cavity and provides the relative optical thickness profile between the pair of surfaces.

The peak frequency of each cavity can be determined from knowledge of the nominal optical thickness of the cavity and the nominal frequency tuning rate for the wavelength scan. Alternatively, the peak frequency of each cavity can be observed from the frequency-transformed interferometric data itself. The interferometric phase of each cavity can be determined from the discrete Fourier transform of the interference data, evaluated approximately at the peak frequency. The interferometric phase distribution (or phase map) across each cavity can be used to determine, for example, the optical thickness variation of each cavity. For a constant homogeneity between the surfaces, the optical thickness variation corresponds to the surface profile of one surface relative to the other surface. Furthermore, in some embodiments, phase maps can be used to determine the refractive index variation (i.e., the transverse variation of the refractive index) and physical thickness variation of a transparent measurement object in a cavity.

Referring to FIG. 1, interferometer system 100 is adapted to measure the optical interference produced by reflections from different surfaces in a four-surface cavity 109, including a back surface 121 of a first reference optic 120, front surface 102 and back surface 103 of a second reference optic 101, and a test surface 111 of a test object 110. Reference surfaces 121, 102, and 103 are partially reflective. The other surface (i.e., the front surface) of first reference optic 120 is typically coated with an anti-reflection layer. Surface 102 is separated from surface 121 by a gap 125 of distance $L_1$, and surface 103 is separated from surface 111 by another gap 115 of distance $L_2$. System 100 includes a mount (not shown) for supporting test object 110 relative to reference optics 120 and 101. As will described in detail further below, reference optic 101 is the enabler optic. Accordingly, reference optic 101 is mounted on an adjustable rotation stage (not shown) for rotating it about one or more axes. Furthermore, the adjustable stage can optionally displace reference optic 101 to remove it from cavity 109, so that the cavity is defined only by reference surface 121 and test surface 111.

System 100 additionally includes a tunable light source 140 (e.g., a laser diode), a driver 145 connected to light source 140 for adjusting the optical frequency of its output, a beam splitter 150, a collimating optic 130, an imaging optic 160, a CCD camera 170, and a frame grabber 180 for storing images detected by camera 170. In some embodiments, a single device can perform both control and measurement functions (e.g., frame grabber 180 may be incorporated in computer 190). Driver 145 tunes the optical frequency ν of light source 140, through a frequency range Δν about a nominal optical frequency of $ν_0$.

During operation, controller 190 causes driver 145 to control the optical frequency of light emitted by light source 140 and causes frame grabber 180 to store an image of the optical interference detected by CCD camera 170 for each of the specified optical frequencies. Frame grabber 180 sends each of the images to controller 190, which analyzes them. In some embodiments, driver 145 linearly modulates the optical frequency of the light source 140 as the series of interference images are being recorded. Alternatively, in other embodiments, the driver can modulate the optical frequency in discrete steps or according to other functions.

During operation, light source 140 directs light having an optical frequency ν to beam splitter 150, which then directs the light to collimating lens 130 to collimate the light into a plane field. Surface 121 reflects a first portion of the light to form a first reference wavefront 105a, and surfaces 102 and 103 of reference optic 101 reflect additional portions of light to form additional reference wavefronts 105b and 105c, respectively. Test surface 111 also reflects a portion of light to form a test wavefront 105d. Lenses 130 and 160 then image wavefronts 105a, 105b, 105c, and 105d onto CCD camera 170 where they form an optical interference pattern.

In the analysis that follows, we first consider the optical interference pattern produced by optical frequency tuning in an elemental two-surface interferometer cavity, for example, the cavity formed by surface 121 and surface 102. The surfaces are separated by a physical gap $L_1$ of air, which has a refractive index of about one. Accordingly, the product of refractive index and gap thickness, which is referred to as the optical thickness, is also $L_1$. The total phase difference, φ, between light rays with wavenumber k reflected from surface 102 and light rays which reflect from surface 121 is given by:

$$\varphi(x, y) = 2kL_1(x, y) + \Phi = 2L_1(x, y)\frac{2\pi v}{c} + \Phi, \quad (1)$$

where ν is the optical frequency of the light, c is the speed of light, and Φ is an overall constant phase. The x and y dependence of gap $L_1$ and phase φ across the field of view are shown explicitly in EQ. 1 to show the spatial variation in phase. Extraction of this phase variation profile, or phase map, is the information that is typically of interest in PSI.

This explicit x and y dependence will be omitted in the equations that follow for the sake of clarity.

Tuning the source optical frequency, ν, produces an interferometric phase variation, φ, that depends on the optical frequency tuning rate, $\dot{v}$, and the cavity optical path difference 2L as $$\dot{\varphi} = \frac{4\pi L_1 \dot{v}}{c}[1 + \eta], \quad (2)$$

where the dot represents differentiation with respect to time. The term $$\eta = \frac{v}{n}\frac{\partial n}{\partial v}$$

is due to the index chromatic dispersion (variation of the index with wavelength). Accounting for the index chromatic dispersion may increase measurement accuracy, particularly for absolute measurements. The cavity interference therefore varies at a frequency $f_C$, which is given by $$f_C = \frac{2L_1 \dot{v}}{c}[1 + \eta]. \quad (3)$$

The frequency in EQ. 3 is the first-order frequency associated with the cavity. There can also be higher-order frequencies that are multiples of frequency $f_C$ and correspond to multiple reflections within the cavity.

In some embodiments, frequency $f_C$ can be determined from EQ. 3 if nominal values for the optical thickness, $L_1$, and optical frequency tuning rate, $\dot{v}$, are known. In addition, the frequency $f_C$ can be identified by transforming the interference intensity data measured by CCD camera 170 into the frequency domain (e.g., by using a Fourier transform). This transform produces a frequency spectrum and identifies the frequency of the corresponding peak in the spectrum.

Once $f_C$ has been determined, and for substantially linear frequency tuning, the interferometric phase of any elemental cavity can be recovered from the complex amplitude of the Discrete Fourier Transform (DFT) of the interference, evaluated at the representative first-order frequency, $f_C$, for that cavity:

$$\varphi = \tan^{-1}\left(\frac{\text{Im}(DFT(f_C))}{\text{Re}(DFT(f_C))}\right), \quad (4)$$

where $$DFT(f_C) = \sum_{j=0}^{N-1} I_j W_j \exp\left[i\frac{2\pi j f_C}{f_S}\right]. \quad (5)$$

In EQ. 5, $I_j$ is the intensity sample measured at the $j^{th}$ optical frequency of the optical frequency tune. N is the total number of intensity samples acquired. $W_j$ are the sampling weights associated with a Fourier window, W, and $f_S$ is the sampling rate. Fourier window, W, is usually selected to suppress contributions to the phase evaluation from additional frequencies far from $f_C$, and from the effect of finite observation intervals. Examples of Fourier windows include Hamming windows and Tukey windows. The Tukey window can be advantageous in embodiments having one or more additional frequency peaks close to $f_C$ as the taper width of the window can be chosen to effectively zero-weight these additional frequencies at $f_C$.

Extraction of the phase, ϕ, for each CCD pixel gives a phase distribution ϕ(x, y) (i.e., phase map) for the cavity. Variations in optical path between the two surfaces can be determined from EQ. 1. It is noted that the results of the phase extraction defined by EQs. 4 and 5 generates phases modulo 2π. These phase ambiguities can be accounted for in the phase map using conventional 2π phase ambiguity unwrapping techniques, commonly known in the art. For a constant homogeneity between the surfaces, as is the case here, the optical thickness profile given by EQ. 1 across the field corresponds to the surface profile of one surface relative to the other.

We now extend the analysis to treat the four-surface cavity 109. This multi-surface cavity produces six elemental two-surface cavities, each of which produce a first-order PSI frequency peak according to EQ. 3 for their respective spacing. For brevity, the elemental cavity bounded by surface 102 and 103, for example, is denoted 102:103. Hence the six elemental cavities are 121:102, 121:103, 121:111, 102:103, 102:111, and 103:111, respectively. The values of the primary gaps 125 and 115 are chosen so that all the elemental cavities have unique OPL's, and hence unique first-order frequencies. For example, cavity 121:103 has a frequency given by EQ. 3, except that the 121:102 optical cavity length of $L_1$ is replaced with the 121:103 cavity length of $L_1$+nT, where n is the refractive index of reference optic 101. Accordingly, the user can simultaneously extract the spatial phase variation and hence the relative optical thickness variation and/or relative surface profile for each elemental cavity according to EQs. 4 and 5 based on the unique first-order frequency corresponding to each elemental cavity.

It is also possible to determine the refractive index variation, or homogeneity, of reference optic 101 using the information obtained by FTPSI analysis. The index variation can be obtained with high precision, assuming nominal values for the index $\bar{n}$ and thickness $\bar{T}$ for reference optic 101 are available. From EQ. 1, the total phase observed at each primary cavity correspond to:

$$\phi_{121:102} = 2kL_1$$

$$\phi_{102:103} = 2knT,$$

$$\phi_{103:111} = 2kL_2 \quad [6]$$

where $$k = \frac{2\pi v}{c}.$$

An additional measurement is made with reference optic 101 removed from the cavity. This measurement gives the phase variation of the 121:111 cavity with object 101 removed as:

$$\phi_{121:111} = 2k(L_1+T+L_2) \quad (7).$$

Solving for the refractive index of object 101, n, yields $$n = \frac{\varphi_{102:103}}{\varphi_{121:111} - \varphi_{103:111} - \varphi_{121:102}}. \quad (8)$$

Since these phases represent total phases, and not the 2π modulo phases obtained from the DFT, we can write for any cavity $$\phi = 2k\bar{n}\bar{L} + \phi \quad (9),$$

where $\bar{n}$ and $\bar{L}$ are nominal values of the index and gap, and ϕ is the local phase deviation from the total phase. Substituting EQ. 9 for each of the individual phases in EQ. 8 produces $$n = \frac{2k\bar{n}\bar{T} + \phi_{102:103}}{2k\bar{T} + \phi_{121:111} - \phi_{103:111} - \phi_{121:102}}, \quad (10)$$

For cases where $2k\bar{T} \gg \phi_{121:111} - \phi_{103:111} - \phi_{121:102}$, and ignoring terms of $$\frac{1}{2k\bar{T}}$$

higher than first order, the index variation of object 101, $\Delta n = n - \bar{n}$, is given by $$\Delta n = \frac{\phi_{102:103} - \bar{n}(\phi_{121:111} - \phi_{103:111} - \phi_{121:102})}{2k\bar{T}}. \quad (11)$$

The ϕ's are determined from their respective modulo-2π phase maps, keeping in mind that $\phi_{121:111}$ is the phase maps of the empty cavity. Determination of the physical thickness variation of object 101, T−$\bar{T}$, follows similarly, or may, for example, be determined directly from EQ. 11 and a measure of the optical thickness variation of object 101.

An advantage of using FTPSI is that interferometric phase measurements for each of pair of surfaces (i.e., each elemental cavity) in the 4-surface cavity are obtained simultaneously because they can be made to occur at different frequencies in the wavelength-tuned PSI data.

Absolute Figure Metrology Using the Enabler Optic

Embodiments of the invention exploit the multiple cavity measurement capability of FTPSI. By using the 4-surface geometry with the second reference optic 101 (the "enabler optic") configured for mechanical motion about two axes, a sequence of measurements are obtained that allow absolute characterization of all the surfaces in the cavity. In other words, one obtains a surface profile for each surface that is independent of any reference surface. The surfaces of the enabler optic are themselves characterized simultaneously with the test surface, providing an independent gauge of the measurement error through comparison with prior measurements. Only the position of the enabler optic is moved during the measurement sequence, minimizing motion control requirements and simplifying automation, if desired.

Figure 2:
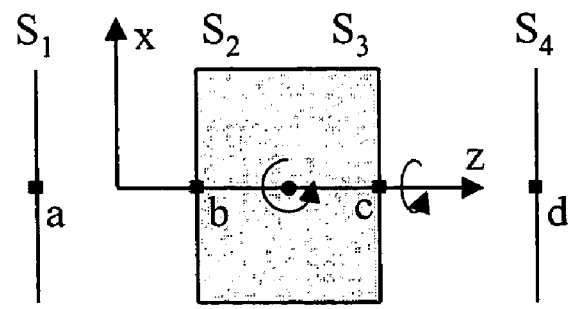
FIG. 2 is a schematic diagram of 4-surface cavity having an adjustably positioned enabler optic to provide additional measurement configurations suitable for absolute surface figure metrology.

The four-surface cavity 109 from FIG. 1 is reproduced in FIG. 2, with surface 121 labeled $S_1$, surfaces 102 and 103 of the enabler optic (reference optic 101) labeled $S_2$ and $S_3$, respectively, and test surface 111 labeled $S_4$. The optical axis for the different wavefronts reflected from the surfaces is labeled as the z-axis. In accordance with FIG. 1, the illumination enters the cavity from the left along the +z direction and the interference is observed from the left.

As indicated in FIG. 2, the enabler optic ("EO") is mounted within interferometer system 100 on a rotatable stage (not shown) that permits it to rotate about both the vertical axis (y-axis) (the x-axis rotation can also be used) and the optical axis (z-axis) with respect to a center point. The stage is also configured to optionally displace reference optic 101 to remove it from cavity 109, so that the cavity is defined only by reference surface 121 and test surface 111.

Referring to FIG. 2, there are 4 points indicated on the 4 surfaces labeled a, b, c, d, all coincident with the z rotation axis. As the EO is rotated 180 degrees about the y-axis, the order of points b and c are exchanged along the z-axis relative to surfaces $S_1$ and $S_4$. The values of a, b, c, d represent the departures of the surfaces from a perfect flat and are thus surface errors. The method relates these surface errors to interferometric wavefront measurements associated with each elemental cavity in the four-surface cavity for different positions of the EO.

Each wavefront measurement is given by the phase extracted by the FTPSI measurement according to EQ. (4) for the first-order frequency corresponding to the elemental cavity. Recall further that each such phase has an x-y field dependence that has been dropped for clarity. For clarity, each surface departure a, b, c, d is defined as twice the actual departure so that the factor of 2 associated with the double pass of the wavefront can be suppressed in the equations below. Furthermore, there is a constant phase offset associated with each wavefront measurement. However, because that offset is constant across the x-y field, it is also suppressed in the equations below.

For simplicity, it is first assumed that the EO has perfect homogeneity with index 1.

The first measurement, with the EO removed, produces the following wavefront equation, where in this and subsequent equations capitals are used to represent wavefront measurements:

$$A = -a - d \quad (12)$$

Note that a positive error is defined when reflecting off the surface from the outside of an optic (from the air side).

The 2$^{nd}$ measurement, with the EO inserted, produces 6 equations:

$$B = -a - b \quad (13)$$

$$C = -a - (-c) \quad (14)$$

$$D = -a - d \quad (15)$$

$$E = b - (-c) \quad (16)$$

$$F = b - d \quad (17)$$

$$G = -c - d \quad (18)$$

The 3$^{rd}$ measurement, after the EO is rotated about y, exchanging points b and c along the z-axis, produces another 6 equations:

$$H = -a - c \quad (19)$$

$$I = -a - (-b) \quad (20)$$

$$J = -a - d \quad (21)$$

$$K = c - (-b) \quad (22)$$

$$L = c - d \quad (23)$$

$$M = -b - d \quad (24)$$

Note that the sign is changed for those surface errors that have been flipped by the Y-rotation operation. Some of these equations are redundant because of the assumption of a perfect homogeneity equal to 1, but they have been included for completeness and later reference.

Also, depending on the location of the center point in the EO, the gap sizes L1 and L2 might change after the 180-degree flip. The only effect of this is that first order-frequencies associated with the corresponding elemental cavities will change, in which case, the new first-order frequencies should be used when extracting the phase for each wavefront measurement according to EQ. (4).

The above set of equations can be solved for any of the four surface errors. For example, using equations (8) and (13), one obtains:

$$c = \frac{C - H}{2}, \quad (25)$$

and using (23) and (25), $$d = \frac{C - H}{2} - L, \quad (26)$$

which gives the surface error for the test object.

The surface errors so determined are valid for the Y meridian, the line of points on the various surfaces that lie in the plane defined by the Y-axis and the optical axis. To obtain the whole surface, the EO is rotated about Z in small increments with measurements obtained at each increment. Absolute measurements of meridians of the two outside surfaces $S_1$ and $S_4$ are then obtained using the (now absolutely known) Y meridian of the EO as a reference. Specifically, for example, absolute surface error d for $S_4$ for each Z-rotation can be determined from the wavefront measurement G because the surface error c is known from the prior measurement of the Y meridian for the EO. Notably, the 180-degree rotation about the Y-axis need only occur once because the absolutely known EO meridian can be used to map other meridians on surfaces $S_1$ and $S_4$ for each incremental rotation about the Z-axis. After many measurements over a rotation range of 180°, the full surface form of both $S_1$ and $S_4$ can be obtained.

Furthermore, the fully characterized absolute surface forms for $S_1$ and $S_4$ can then be used as reference surfaces to fully characterize $S_2$ and $S_3$ of the EO for all meridians in an additional measurement. Alternatively, if all of the prior measurements have been saved for the full x-y field, they can be combined as one large matrix equation to determine the absolute form of all the surfaces $S_1$, $S_2$, $S_3$, and $S_4$.

Notably, the resulting information for reference optic 101 (the EO) can gauge each measurement via comparisons with past measurements. In this way, it is possible to assess the residual error in the current measurement by the deviation of the EO surfaces from prior measurements, for example, by the average of many such measurements done in the past.

Homogeneity Effects

The effect of the index homogeneity of the reference optic 101 (the EO) to the measurement can now be discussed. For example, measurements #1 and #2 (and/or measurements #1 and #3) can be used to calculate both the physical thickness variation and/or homogeneity variation of the EO, as described in the above FTPSI section.

Each wavefront measurement variable can be associated with one of the six $1^{st}$ order elemental cavities in the 4-surface geometry. For those elemental cavities that physically include the EO, one should subtract the influence of the plate on the wavefront. This can be done by subtracting a term proportional to the optical thickness of the EO minus the optical thickness of the air it displaces, i.e., $n_{glass}T - n_{air}T \approx (n_2-1)T$. The values of n and T used are those measured along the beam line. For example, of the two $1^{st}$ order wavefront measurements used in Eq. (25), only one (C) includes the effects of the EO. The value that must be subtracted from this measurement is $(n_{bc}-1)T_{bc}$, where the subscript bc refers to the ray line from point b to c. Thus, the solution for surface error c accounting for the homogeneity variations of the EO becomes:

$$c = \frac{C - H - (n_{bc}-1)T_{bc}}{2}. \quad (27)$$

For surface error d, wavefront L is also influenced by the parallel plate:

$$d = \frac{C - H - (n_{bc}-1)T_{bc}}{2} - L + (n_{bc}-1)T_{bc} \quad (28)$$
$$= \frac{C - H - 2L + (n_{bc}-1)T_{bc}}{2}.$$

The homogeneity and thickness variation can also be extracted from the data in a manner similar to that described in the above FTPSI section. Specifically, the equations for $T_{bc}$ are;

$$T_{bc} = \overline{T} + [A - B - G] \quad (29)$$

and/or $$T_{bc} = \overline{T} + [A - H - M] \quad (30)$$

from the flipped measurement. The index $n_{bc}$ is given by $$n_{bc} = \overline{n} + \frac{E}{T_{bc}}, \text{ and/or} \quad (31)$$

$$n_{bc} = \overline{n} + \frac{K}{T_{bc}} \quad (32)$$

from the flipped measurement.

Absolute Figure Metrology of Curved Test Surfaces

Figure 3:
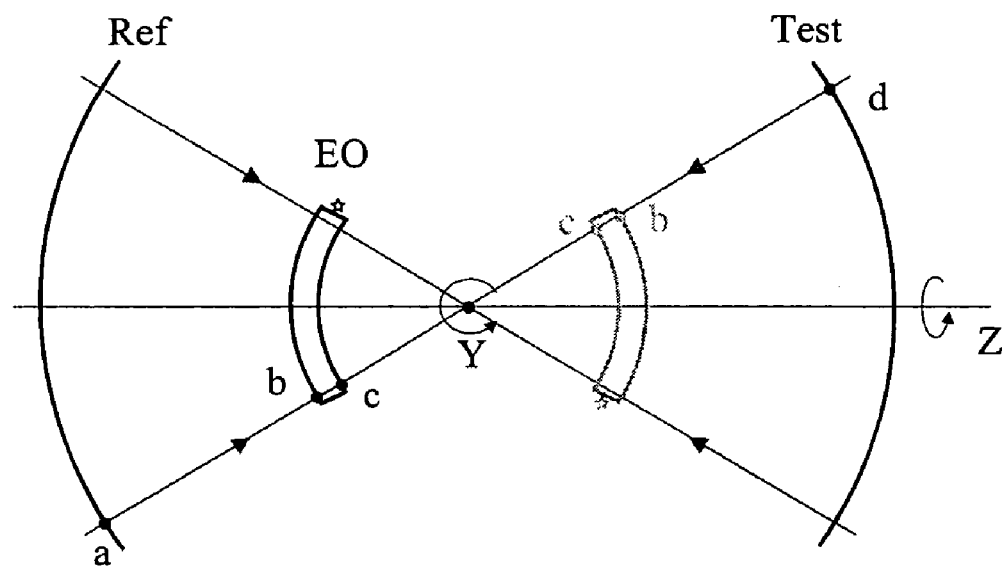
FIG. 3 is a schematic diagram of another 4-surface cavity for used with a curved test surface.

The technique can also be used on a curved test surface (e.g., a concave spherical surface). In this case, one uses a four-surface cavity such as that shown in FIG. 3. In this embodiment, the second reference optic (labeled "EO") is a curved window of thickness T with both surfaces having a common center of curvature. It is positioned confocal with a reference surface (labeled "Ref") provided by another reference optic and the test surface (labeled "Test"). As shown in FIG. 3, and similar to FIG. 2, the EO is fixtured to rotate about the Y-axis, which comes out of the page and is coincident with the center of curvature point, and to also rotate about the Z-axis, which corresponds to the optical axis for the different wavefronts and is also coincident with the center of curvature point. In addition, the EO is fixtured to be optionally removed from the cavity. To accommodate the curved four surface cavity, the interferometer system 100 is modified so that collimating optic 130 is replaced with a focusing optic that causes the wavefront incident on the 4-surface cavity to be converging towards the common center of curvature prior to contacting reference surface Ref.

The measurement sequence is the same as that for the flat test surface described above with reference to FIG. 2. A rotation about Y produces a meridian parallel to X that can be determined absolutely and subsequent rotations about Z allow that meridian to be the absolute reference for the remainder of the Test and Reference surfaces.

Additional Embodiments of the Enabler Optic (EO)

In further embodiments, one may only want the absolute surface figure along a single meridian. In such cases, it is not necessary for the EO to be mounted to rotate about the Z-axis.

Furthermore, in other embodiments, the EO may not be mounted to be adjustably removed from the cavity. In other words, the EO may be fixed in the cavity and mounted only for the 180-degree rotation about the Y-axis and optionally rotation about the Z-axis. According to the above, the wavefront measurement A corresponding the empty cavity (i.e., with the EO removed) is only used to account for inhomogeneity in EO. In embodiments in which the EO is fixed in the cavity, the homogeneity and/or thickness variation of the EO may be precalibrated.

Alternatively, the surface errors of the EO (and therefore its thickness variation) might be unknown, but one may assume that the homogeneity profile of the EO is uniform (i.e., there is no x-y dependence on the refractive index n of the EO) and known, even if it is not equal to one. In such cases, the empty cavity measurement A is not necessary, as shown below.

Taking into account a uniform homogeneity for the EO with $n \neq 1$, the wavefront equations become:

$$B = -a - b \quad (33)$$

$$C = -a + nc \quad (34)$$

$$D = -a - d \quad (35)$$

$$E = nb + nc \quad (36)$$

$$F = nb - d \quad (37)$$

$$G = -c - d \quad (38)$$

Rotating the EO about y, thereby exchanging the order of points b and c, yields:

$$H = -a - c \quad (39)$$

$$I = -a + nb \quad (40)$$

$$J = -a - d \quad (41)$$

$$K = nc + nb \quad (42)$$

$$L = nc - d \quad (43)$$

$$M = -b - d \quad (44)$$

These equations can then be solved for the four surface errors. For example, using equations (34) and (39) I obtain $$c = \frac{C-H}{n+1}, \tag{45}$$

and using (43) and (45), $$d = \frac{n}{n+1}(C-H) - L. \tag{46}$$

As above, the surface errors are only valid for the Y-meridian, the line of points on the various surfaces that lie in the plane defined by the Y-axis and the optical axis. The surface error for additional meridians, if desired, are determined as above using rotations of the EO about the Z-axis.

Frequency Isolation

For the best metrology for all the surfaces, the cavity geometry for both flats and spheres are preferably optimized to maximize $1^{st}$ order frequency isolation of the different frequency peaks for the FTPSI measurement. Specifically, the $1^{st}$-order frequencies of interest should be isolated from all other interference frequencies generated by the interferometer, including frequencies generated by multiple interference cavities (i.e., higher order reflections). As described in U.S. Patent Application Publication No. US-2003-0160968-A1 entitled "PHASE SHIFTING INTERFEROMETRY METHOD AND SYSTEM" by Leslie Deck, mentioned above, the optimum configuration for first-order frequency isolation when measuring optical flats is one in which the ratio of the nominal optical path lengths between any two elemental cavities in the four-surface cavity is a unique power of (M+1) where M is the suppression order parameter, which defines the highest multiple interference order to be suppressed (typically 2 or 3).

For curved surfaces, such as spheres, the radii of the two outer surfaces in the cavity further constrain the shape and position of the EO. Assume the radii of the test and reference surfaces are $r_1$ and $r_2$ respectively. Then the thickness of the EO is given by $$T = \frac{r_1 + r_2}{(M+1)^2 n + (M+1)n + 1} \tag{47}$$

where n is the index of the EO and M is the value of the suppression order parameter. Assuming the EO is the smallest primary cavity and is situated to the left of the focus point as shown in FIG. 3, EQ. (47) can be used to find $r_3$, the distance from the concave surface of the EO to the focus point (which is also the radius of the EO concave surface) via;

$$r_3 = \frac{(M+1)^2 n(r_1 + r_2)}{(M+1)^2 n + (M+1)n + 1} - r_2. \tag{48}$$

The radius of the convex surface is then just $r_3+T$. For example, assume M=3, the reference and test surfaces are standard GPI F3.3 spheres (radius=335 mm), and the EO index is n=1.5, then T=21.61 mm and $r_3$=183.71 mm.

Transfer Standards

After the absolute surface error characterization of the test surface, the test surface may be transferred to a conventional interferometer for use as the reference surface (this is known in the art as a "transfer standard"). The surface errors for that reference surface can be stored and subtracted from the measurements by the conventional interferometer to provide absolute surface metrology using the conventional interferometer. This is applicable to either flat or curved test surfaces.

Additional Embodiments for FTPSI Processing

The absolute figure metrology disclosed herein is not limited to FTPSI processing based on linear wavelength tuning.

For example, as described in U.S. Patent Application Publication No. US-2003-0160968-A1 entitled "PHASE SHIFTING INTERFEROMETRY METHOD AND SYSTEM" by Leslie Deck, mentioned above, FTPSI features methods and systems in which PSI data is transformed into a domain that produces spectrally separated peaks each corresponding to a particular pair of surfaces in an interferometric cavity defined by multiple pairs of surfaces. Each peak provides optical path length and surface reflectivity information about a corresponding pair of surfaces in the cavity. As a result, the interferometric data from such cavities provides simultaneous information about multiple surfaces.

To produce the spectrally separated peaks, the interference signal can be phase-shifted using any method that modulates the contribution from cavities of different optical path length at different frequencies. For example, wavelength-tuned PSI data produces such a result because a change in optical frequency induces a corresponding change in interference phase that is proportional to an optical path length (OPL). Similarly, for example, the interference signal can be phase-shifted by varying the inclination angle of the light beam illuminating the cavity.

In embodiments where the phase-shifting is substantially linear in time, the transformation can be a frequency transform (e.g., a Fourier transform) that converts the interference signal from the time domain to the frequency domain. In such cases, each frequency in the transform domain corresponds to a particular OPL. In other embodiments, the interference signal is transformed into the OPL domain. Such a transformation can be achieved by calibrating the phase-shifting component (e.g., the tuning characteristic of a wavelength-tuned source) and compensating the frequency transform for any nonlinearity in the phase-shifting. Alternatively, the phase-shifting can be monitored in real time using, for example, a reference cavity to allow a direct transformation of the interference signal to the OPL domain (which will be referred to subsequently as the OPL-transform).

Automation, Image Processing, and Software

In preferred embodiments, the computer controls the stage(s) supporting the EO to automatically position the EO for each of the different measurements in the absolute figure metrology measurement. To facilitate precisely positioning by the stages, the EO can include one or more alignment marks within the field of view of the camera. Image processing techniques can then be used to determine the precise motion imparted to the EO by the stage(s) based on the change in position of the various alignment marks as seen by the camera.

In any of the embodiments described above, the computer can include hardware, software, or a combination of both to control the other components of the system and to analyze the phase-shifted images to extract the desired information about the test surface and/or EO surfaces. The analysis described above can be implemented in computer programs using standard programming techniques. Such programs are designed to execute on programmable computers each comprising a processor, a data storage system (including memory and/or storage elements), at least one input device, at least one output device, such as a display or printer. The program code is applied to input data (e.g., phase-shifted images from a CCD camera) to perform the functions described herein and generate information (e.g., the topography of a selected surface), which is applied to one or more output devices. Each computer program can be implemented in a high-level procedural or object-oriented programming language, or an assembly or machine language. Each such computer program can be stored on a computer readable storage medium (e.g., CD ROM or magnetic diskette) that when read by a computer can cause the processor in the computer to perform the analysis described herein.

A number of embodiments of the invention have been described. Nevertheless, it will be understood that various modifications may be made without departing from the spirit and scope of the invention.

What is claimed is:

1. An apparatus comprising:
   an interferometer comprising a series of three partially reflective reference surfaces, wherein the interferometer is configured to direct electromagnetic radiation to a test surface along a path through the series of three partially reflective reference surfaces, and direct the electromagnetic radiation reflected from each of the surfaces to form an optical interference pattern on a detector,
   wherein the interferometer comprises a first reference optic supporting the first reference surface and a second reference optic supporting the second and third reference surfaces, and
   wherein the second reference optic is configured to adjustably rotate to exchange an order of the second and third reference surfaces along the path relative to the first reference surface.

2. The apparatus of claim 1, wherein the second reference optic is further configured to adjustably rotate about the path of the electromagnetic radiation.

3. The apparatus of claim 1, wherein the second reference optic is further configured to be selectively removed from the path of the electromagnetic radiation so that the electromagnetic radiation reflects only from the first reference surface and the test surface.

4. The apparatus of claim 1, further comprising a mount for supporting a test part having the test surface.

5. The apparatus of claim 1, wherein the references surfaces are substantially flat.

6. The apparatus of claim 1, wherein the reference surfaces each comprise a spherical portion.

7. The apparatus of claim 6, wherein the spherical portions comprise a common center of curvature.

8. The apparatus of claim 1, wherein the interferometer comprises one or more imaging optics to image the reflected electromagnetic radiation to the detector.

9. The apparatus of claim 1, further comprising:
   a source for providing the electromagnetic radiation, wherein the source comprises a modulation component configured to vary a property of the electromagnetic radiation provided by the source, wherein the variation causes pairs of the surfaces that have different optical path separations to contribute differently to the interference signal; and
   the detector, wherein the detector is configured to record an interference signal at different locations of the optical interference pattern in response to the variation of the property of the electromagnetic radiation.

10. The apparatus of claim 9, wherein the modulation component is configured to vary a frequency of the electromagnetic radiation.

11. The apparatus of claim 9, further comprising an electronic processor coupled to the source and the detector, wherein the electronic processor is configured to process the interference signals recorded by the detector at the different locations for at least a first orientation of the second reference optic in which the second reference surface precedes the third reference surface relative to the first reference surface and a second orientation in which the second reference surface follows the third reference surface relative to the first reference surface.

12. The apparatus of claim 11, wherein the electronic processor is configured to process the interference signals for the different orientations of the second reference optic to determine absolute surface figure information about the test surface.

13. The apparatus of claim 12, wherein the electronic processor stores information about at least one of a surface profile and a homogeneity profile for the second reference optic and uses that information to estimate the accuracy of the absolute surface figure information about the test surface.

14. The apparatus of claim 12, wherein the electronic processor is further configured to process the interference signals recorded by the detector at the different locations for additional orientations of the second reference optic in which the second reference optic is rotated about the path of the electromagnetic radiation to determine the absolute surface figure information about the test surface.

15. The apparatus of claim 12, wherein the electronic processor is further configured to process the interference signals recorded by the detector at the different locations when the second reference optic is removed from the path of the electromagnetic radiation to determine the absolute surface figure information about the test surface.

16. The apparatus of claim 12, wherein for each orientation, the electronic processor is configured to transform the interference signal for at least one of the locations to produce a spectrum having a peak at a spectral coordinate corresponding to each pair of the surfaces, and identify the spectral coordinate of the peak corresponding to one or more selected pairs of the surfaces.

17. The apparatus of claim 16, wherein for each orientation the electronic processor is further configured to extract a spectral phase of the interference signal, for each location, at the spectral coordinate of the peak corresponding to each selected pair of surfaces, and determine an optical path distance, for each location, between each selected pair of surfaces based on the extracted phases.

18. The apparatus of claim 16, wherein the electronic processor transforms the interference signal from a time domain into a frequency domain.

19. An apparatus comprising:
   a source for providing a electromagnetic radiation and configured to vary a frequency of the electromagnetic radiation;
   an interferometer comprising a series of three partially reflective reference surfaces, wherein the interferometer is configured to direct the electromagnetic radiation to a test surface along a path through the series of three partially reflective reference surfaces, and direct the electromagnetic radiation reflected from each of the surfaces to form an optical interference pattern on a detector;

the detector, wherein the detector is configured to record an interference signal at different locations of the optical interference pattern in response to the variation of the frequency of the electromagnetic radiation; and an electronic processor coupled to the source and the detector, wherein the interferometer comprises a first reference optic supporting the first reference surface and a second reference optic supporting the second and third reference surfaces, wherein the second reference optic is configured to adjustably rotate to exchange an order of the second and third reference surfaces along the path relative to the first reference surface and is further configured to be selectively removed from the path of the electromagnetic radiation so that the electromagnetic radiation reflects only from the first reference surface and the test surface, and wherein the electronic processor is configured to process the interference signals recorded by the detector at the different locations for at least a first orientation of the second reference optic in which the second reference surface precedes the third reference surface relative to the first reference surface, a second orientation in which the second reference surface follows the third reference surface relative to the first reference surface, and a third orientation in which the second reference optic is removed from the path of the electromagnetic radiation so that the electromagnetic radiation reflects only from the first reference surface and the test surface, to determine absolute surface figure information about the test surface.

20. A method comprising:

directing electromagnetic radiation to a test surface along a path through a series of three partially reflective reference surfaces, and directing the electromagnetic radiation reflected from each of the surfaces to form an optical interference pattern; and rotating a reference optic supporting the second and third reference surfaces and positioned between the first reference surface and the test surface to exchange an order of the second and third reference surfaces along the path.

21. The method of claim 20, further comprising:

processing information about the optical interference pattern for at least a first orientation of a reference optic in which the second reference surface precedes the third reference surface along the path relative to the first reference surface and a second orientation in which the second reference surface follows the third reference surface along the path relative to the first reference surface to determine absolute surface figure information about the test surface.

22. The method of claim 21, further comprising:

processing information about the optical interference pattern for additional orientations of the reference optic in which the reference optic is rotated about the path of the electromagnetic radiation to determine the absolute surface figure information about the test surface.

23. The method of claim 21, further comprising:

processing information about the optical interference pattern for additional orientations of the reference optic in which the reference optic is removed from the path of the electromagnetic radiation to determine the absolute surface figure information about the test surface.

24. The method of claim 21, further comprising:

storing information about at least one of a surface profile and a homogeneity profile for the reference optic and using the information about the reference optic to estimate the accuracy of the absolute surface figure information about the test surface.

25. The method of claim 20, wherein the references surfaces are substantially flat.

26. The method of claim 20, wherein the reference surfaces each comprise a spherical portion.

27. The method of claim 20, further comprising:

varying a property of the electromagnetic radiation; and recording an interference signal at different locations of the optical interference pattern in response to the variation of the property of the electromagnetic radiation, wherein the variation causes pairs of the surfaces that have different optical path separations to contribute differently to the interference signal.

28. The method of claim 27, wherein the varied property is a frequency of the electromagnetic radiation.

29. The method of claim 27, further comprising, for each orientation of the rotated reference optic:

transforming the interference signal for at least one of the locations to produce a spectrum having a peak at a spectral coordinate corresponding to each pair of the surfaces; and identifying the spectral coordinate of the peak corresponding to one or more selected pairs of the surfaces.

30. The method of claim 29, further comprising, for each orientation of the rotated reference optic:

extracting a spectral phase of the interference signal, for each location, at the spectral coordinate of the peak corresponding to each selected pair of surfaces; and determining an optical path distance, for each location, between each selected pair of surfaces based on the extracted phases.

* * * * *

UNITED STATES PATENT AND TRADEMARK OFFICE
CERTIFICATE OF CORRECTION

PATENT NO. : 7,042,578 B2
APPLICATION NO. : 11/017210
DATED : May 9, 2006
INVENTOR(S) : Leslie L. Deck It is certified that error appears in the above-identified patent and that said Letters Patent is hereby corrected as shown below:

Column 1
Line 46, insert the word --to-- after the word "relative"

Column 3
Line 21, before the word "electronic" delete the word "he" and insert the word --the--

Column 5
Line 34, insert the word --a-- before the words "4-surface"
Line 39, after the word "for" delete the word "used" and insert the word --use--
Line 50, insert the word --a-- before the words "4-surface"

Column 6
Line 34, delete the word "a" after the word "by"

Column 7
Line 4, insert the word --be-- after the word "will"

Column 10
Line 50, after the word "Metrology" delete the word "Using" and insert the word --using--

Column 14
Line 29, after the word "corresponding" insert the word --to--

Column 16
Line 31, after the word "path" delete the word "length" and insert the word --lengths--

UNITED STATES PATENT AND TRADEMARK OFFICE
CERTIFICATE OF CORRECTION

PATENT NO. : 7,042,578 B2
APPLICATION NO. : 11/017210
DATED : May 9, 2006
INVENTOR(S) : Leslie L. Deck It is certified that error appears in the above-identified patent and that said Letters Patent is hereby corrected as shown below:

Column 18
Line 63, after the word "providing" delete the word "a" and insert the word --an--

Signed and Sealed this

Twentieth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,042,578 B2
APPLICATION NO. : 11/017210
DATED : May 9, 2006
INVENTOR(S) : Leslie L. Deck It is certified that error appears in the above-identified patent and that said Letters Patent is hereby corrected as shown below:

Column 1
Line 46, insert the word --to-- after the word "relative"

Column 3
Line 21, before the word "electronic" delete the word "he" and insert the word --the--

Column 5
Line 34, insert the word --a-- before the words "4-surface"
Line 39, after the word "for" delete the word "used" and insert the word --use--
Line 50, insert the word --a-- before the words "4-surface"

Column 6
Line 34, delete the word "a" after the word "by"

Column 7
Line 4, insert the word --be-- after the word "will"

Column 10
Line 50, after the word "Metrology" delete the word "Using" and insert the word --using--

Column 14
Line 29, after the word "corresponding" insert the word --to--

Column 16
Line 31, after the word "path" delete the word "length" and insert the word --lengths--

UNITED STATES PATENT AND TRADEMARK OFFICE
CERTIFICATE OF CORRECTION

PATENT NO. : 7,042,578 B2
APPLICATION NO. : 11/017210
DATED : May 9, 2006
INVENTOR(S) : Leslie L. Deck It is certified that error appears in the above-identified patent and that said Letters Patent is hereby corrected as shown below:

<u>Column 18</u>
Line 63, after the word "providing" delete the word "a" and insert the word --an--

Signed and Sealed this

Tenth Day of April, 2007

JON W. DUDAS
*Director of the United States Patent and Trademark Office*